(12) United States Patent
Li

(10) Patent No.: US 6,490,809 B1
(45) Date of Patent: Dec. 10, 2002

(54) BRAKE STRUCTURE OF A TAPE MEASURE

(76) Inventor: Shin-Lin Li, No. 22, Lane 81, Sec. 2, Tunha S.Rd, Taipei City (TW)

( * ) Notice: Subject to any disclaimer, the term of this patent is extended or adjusted under 35 U.S.C. 154(b) by 0 days.

(21) Appl. No.: 09/905,950

(22) Filed: Jul. 17, 2001

(51) Int. Cl.$^7$ ................................................ G01B 3/10
(52) U.S. Cl. .............................. 33/767; 33/761; 33/755
(58) Field of Search ........................ 33/767, 755, 761, 33/759, 756, 764, 766, 768

(56) References Cited

U.S. PATENT DOCUMENTS

| | | | | |
|---|---|---|---|---|
| 4,516,325 A | * | 5/1985 | Cohen et al. | 33/767 |
| 4,976,048 A | * | 12/1990 | Blackman | 33/767 |
| 5,007,178 A | * | 4/1991 | Dewire et al. | 33/767 |
| 5,245,761 A | * | 9/1993 | Waldherr | 33/767 |
| 5,379,523 A | * | 1/1995 | Wingert | 33/769 |
| 5,395,069 A | * | 3/1995 | Chen | 33/767 |
| 6,026,585 A | * | 2/2000 | Li | 33/767 |
| 6,032,380 A | * | 3/2000 | Li | 33/755 |
| 6,085,433 A | * | 7/2000 | Li | 33/755 |
| 6,276,071 B1 | * | 8/2001 | Khachatoorian | 33/761 |
| 6,405,451 B1 | * | 6/2002 | Hsu | 33/761 |

* cited by examiner

*Primary Examiner*—Diego Gutierrez
*Assistant Examiner*—Yaritza Guadalupe
(74) *Attorney, Agent, or Firm*—Rosenberg, Klein & Lee

(57) ABSTRACT

An improved brake structure of a tape measure mainly includes a pair of corresponding slide slots which are set at the inner side of one side of the upper housing and the lower housing of a tape measure, a pair of lodging troughs extended from the end portion, which are near the outlet of the tape, of the sliding slots, a pair of slide ways at both sides of the control part combined in slide slots to slide in the slide slots, a slide piece extended from the front end portion of the control part, a pair of lodging blocks extended from both sides of the center of the slide piece, and an inset hole set at the front end of the slide piece. The lodging blocks are hold to the upper edge of the lodging troughs. Below the slide slots of the enclosure, a position pair of columns is set at one side to be combined with a brake part. A guide piece of the brake part is inset into the inset hole at the front end of the slide piece. When the control part moves downward, the slide piece also moves downward to make the lodging blocks of the slide piece clipped into the lodging troughs of the enclosure and drive the brake part to turn in a certain angle such that the brake part holds to the surface of the tape to achieve the purpose of braking the tape.

3 Claims, 3 Drawing Sheets

BRAKE STRUCTURE OF A TAPE MEASURE

BACKGROUND OF THE INVENTION

1. Field of the Invention

The present invention relates to an improved brake structure of a tape measure, especially to an improved brake structure of a tape measure which can reduce the volume substantially and achieve good braking effect.

2. Description of the Prior Art

When a tape measure is used to proceed measuring task, the brake structure therein plays a very important role because of that the braking ability of the brake structure is essential to position the tape such that the measuring task can be accomplished and the situation of hurting a hand of a user due to retraction motion without advance warning.

Commonly used brake structure is mainly composed of a control part and a brake piece. When a tape measure is assembled, a room is essential to be extended from a lateral side of an enclosure of the tape measure, and a slide slot is set on the room to combine with the brake piece and make brake piece slide on the slide slot. Besides, the control part is set at the top of the enclosure, and one end of the control part holds to one end of the brake piece to make the control part push the brake piece move downward and hold to the tape of the tape measure such that braking effect is achieved. However, the setting method makes not only volume of the enclosure larger but also manufacturing cost higher, and, besides, the control part only can be set at the top of the enclosure.

Therefore, the object described above has many disadvantages such that it is not a perfect design and need being improved.

The inventor of the present invention ruminated over the disadvantages resulted from the habitually used brake structures of a tape measure, and earnestly deliberated the way of improvement and innovation. After studying hard for a long period, the inventor eventually succeeded in inventing the present invention, an improved brake structure of a tape measure.

SUMMARY OF THE INVENTION

The first purpose of the present invention is to provide an improved brake structure of a tape measure which can substantially reduce the area of the enclosure of the tape measure.

The second purpose of the present invention is to provide an improved brake structure of a tape measure which has advantages of controlling easily, simple structure, assembling easily, and so on.

The improved brake structure of a tape measure which can achieve the purposes described above mainly comprises an enclosure of the tape measure, a control part, a brake part; the enclosure includes an upper housing, a lower housing, and a turning wheel wrapped with tape is combined inside the enclosure. A pair of arc slide slots along the arc of the turning wheel are set at an inner side of the upper housing and the lower housing. A lodging trough is extended from the end portion of each slide slot nearby the outlet of the tape, and a position column is set slightly below the slide slot.

A push key is set at the surface of the control part, wherein a pair of slide ways are set at both sides while a slide piece is extended from the front end portion. A pair of lodging blocks is extended from both sides of the center and an inset hole is set at the front end of the slide piece. In this way, the slide ways of both sides of the control part are combined in the slide slots of the upper housing and the lower housing to slide in the sliding slots and thus, the lodging blocks of the slide piece at the front end can hold to the upper edge of the lodging trough. The main part of the brake part is a hollow cylinder to slip on and the position columns of the upper housing and the lower housing and further rotate about these position columns. A brake piece and a guide piece are extended from the brake part. The guide piece is used for lodging in the inset hole of the slide piece at the front end portion of the control part. When the user uses the push key of the control part to make the control part move downward, the slide piece also moves downward to make the lodging blocks of the slide piece lodged in the lodging troughs of the end portion of the slide slots such that the control part can be positioned. The brake part can be affected by the downward motion of the slide piece to turn in a certain angle to make the brake piece thereon hold to the surface of the tape such that the function of braking tape is accomplished.

BRIEF DESCRIPTION OF THE DRAWINGS

The drawings disclose an illustrative embodiment of the present invention which serves to exemplify the various advantages and objects hereof, and are as follows.

DIAGRAM REMARKS

Figure 1:
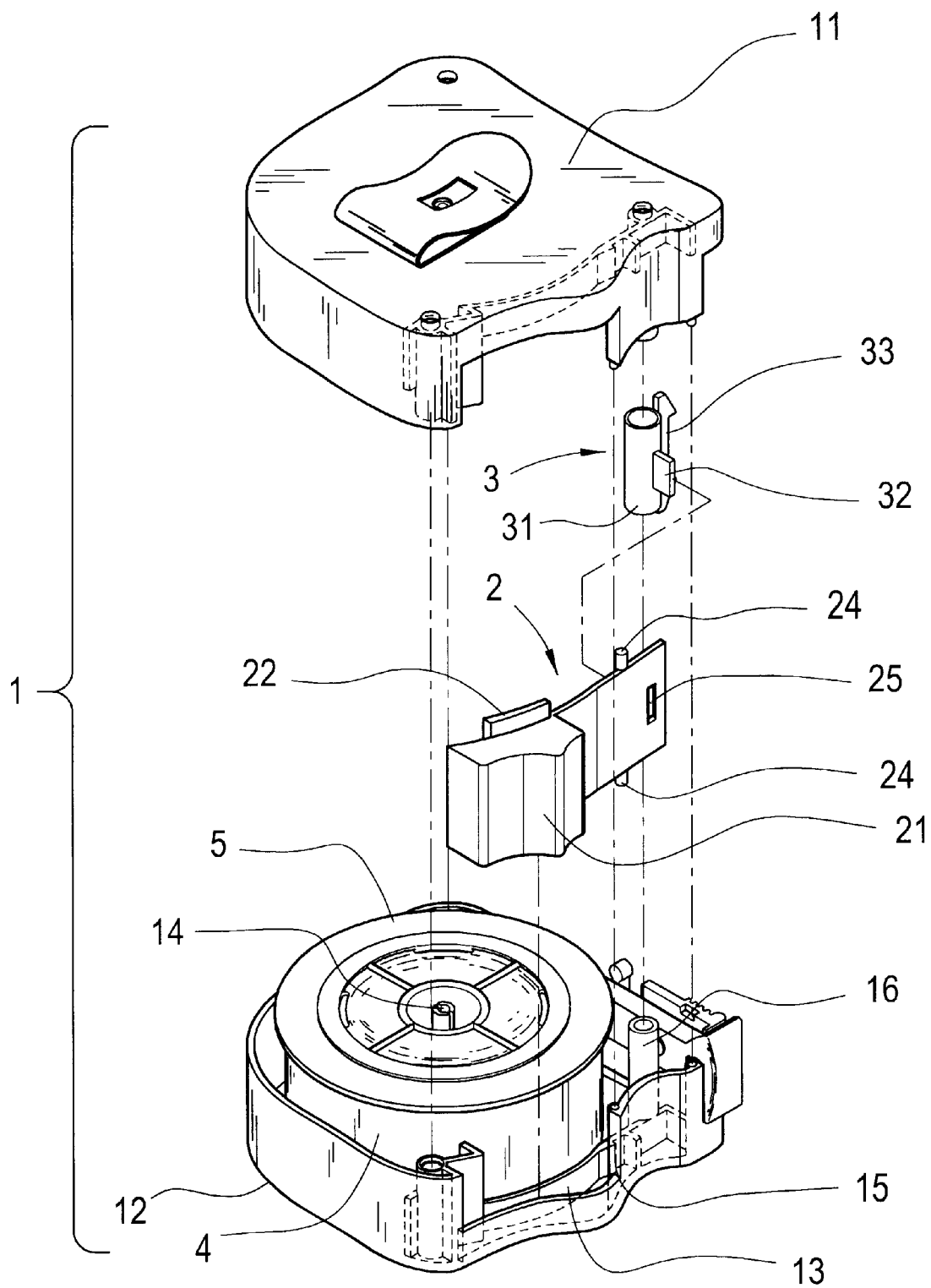
FIG. 1 is the exploded drawing of the improved brake structure of a tape measure of the present invention.

1 Enclosure
11 Upper housing
12 Lower housing
13 Slide slot
14 Shaft bar
15 Lodging trough
16 Position column
2 Control part
21 Push part
22 Slide way
23 Slide piece
24 Lodging block
25 Inset hole
3 Brake part
31 Main part
32 Guide piece
33 Brake piece
4 Tape
5 Turning wheel

DETAILED DESCRIPTION OF THE PREFERRED EMBODIMENT

Figure 2:
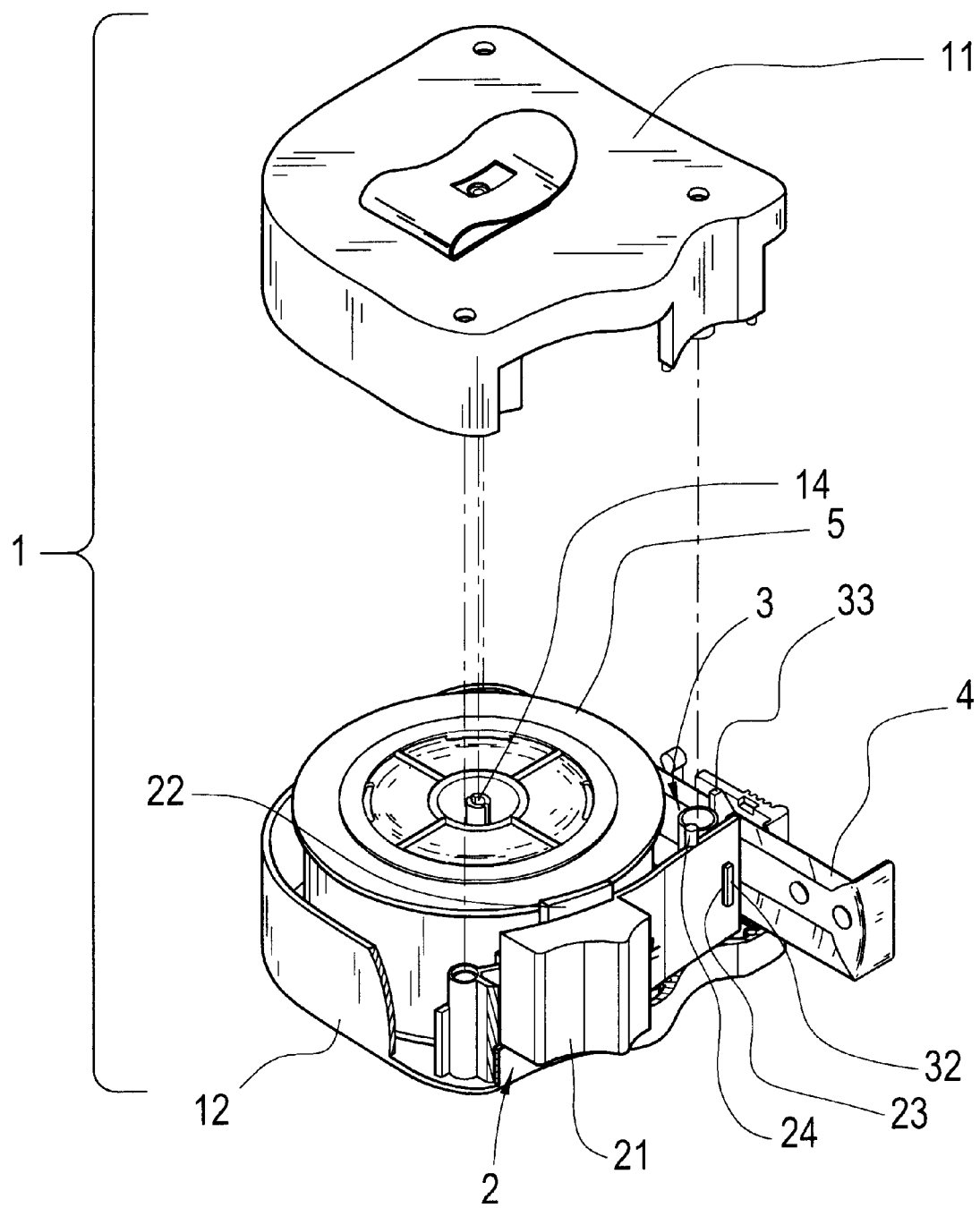
FIG. 2 is the schematic drawing of combination of the improved brake structure of a tape measure of the present invention.

Referring to FIG. 1 and FIG.2, the improved brake structure of a tape measure provided from the present invention mainly comprises:

An enclosure 1 comprises an upper housing 11 and a lower housing 12. The lower housing 12 has a shaft bar 14 to be slipped on by a turning wheel 5 wrapped with a tape 4. A pair of slide slots 13 are set at the inner side of one side of the upper housing 11 and the lower housing 12. The slide slots 13 are shaped as an arc according to the arc curve of the turning wheel 5. A lodging trough 15 is extended from the end portion, which is near the opening of the tape 4, of the slide slot 13. A hollow position column 16 is set slightly below the lodging trough 15. The hollow position column 16 has inside threads to be used as a screw hole for locking with screws as the upper cover 11 is combined with the lower cover 12.

A control part 2 has a push key 21 set on the surface, and a pair of slide way 22 are extended from both sides. Besides, a slide piece 23 is extended from the front end portion, and a pair of lodging blocks 24 are set at both sides of the center of the slide piece 23, and an inset hole 25 is set at the proper position of the front end portion of the slide piece 23.

A brake 3 has a main part 31 which is a hollow cylinder and can slip on the position columns 16 of the upper cover 11 and the lower cover 12, and rotate about the position columns, and, besides, a guide piece 32 and a brake piece 33 are extended from the main part 31.

The pair of the slide ways 22 of the control part 2 are combined in the slide slots 13 of the upper cover 11 and the lower cover 12 to make the control part 2 enable to slide back and forth in the slide ways 13. The push key 21 protrudes the upper cover 11 and lower cover 12. The lodging blocks 24 of both sides of the slide piece 23 of the front end portion of the control part 2 holds to the upper edge of the lodging troughs 15 at the end portion of the slide ways 13, the guide piece 32 of the brake part 3 is inset into the inset hole 25 at the front end portion of the slide piece 23, the brake structure of the present invention is accomplished.

Figure 3:
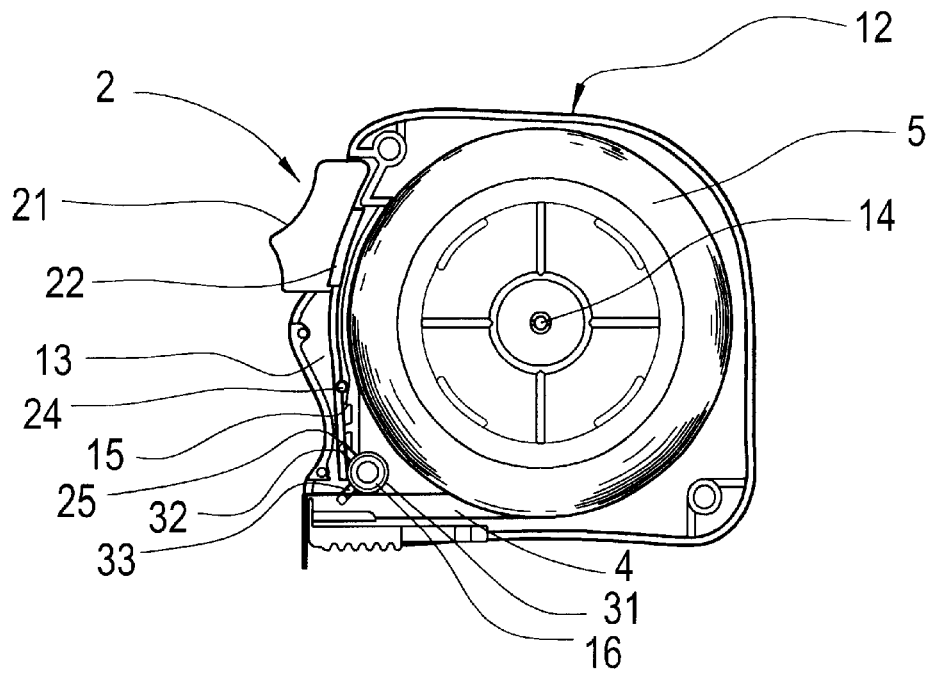
FIG. 3 is the exemplary drawing of the improved brake structure of a tape measure.
Figure 3:
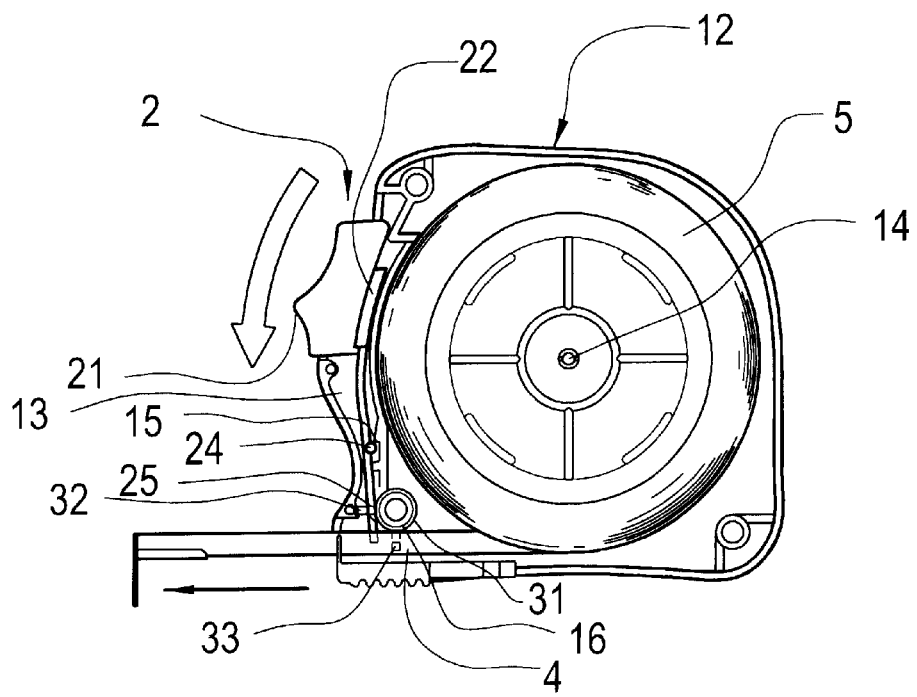

Referring to FIG. 3 A, B, which is the exemplary drawing of the improved brake structure of a tape measure of the present invention, when the tape 4 is pulled to the desired position by a force, the user can press and push the push key 21 on the surface of the control part 2 downward to make the control part 2 move downward by the sliding ability of the slide ways 22 of both sides such that the slide piece 23 at the front end portion also moves downward at the same time. Therefore, the lodging blocks 24 extended from the slide piece 23 is lodged in the lodging slots 15 to make the control part 2 positioned. Besides, the guide piece 32 inset in the inset hole 25 moves downward due to affection of downward motion of the slide piece 23 to make the main part 31 of the brake part 3 turn in a certain angle such that the brake piece 33 hold on the surface of the tape 4 of the tape measure to achieve the purpose of braking the tape. As the user wants to retract the tape 4, the user only has to push the control part 2 to move upward to make the lodging block 24 depart from the lodging slot 15 of the end of the sliding slot 13 and drive the guide piece 32 of the brake part 3 move upward such that the brake piece 33 of the brake part 3 departs from the surface of the tape 4. In this way, the tape enables be retracted into the enclosure of the tape measure.

Comparing with other commonly used technologies, the improved structure of a tape measure provided from the present invention has advantages as follows:

1. The sliding slots of the present invention is set according to the shape of the turning wheel, so it is not essential to increase additional space to set the sliding slots for combining with the brake part such that the purpose of reducing the whole volume of the enclosure of the tape measure is achieved.

2. In the present invention, the brake part is slipped on the hollow column, and the hollow column has internal threads to form a screw hole for locking with a screw as the upper housing is combined with the lower housing such that the space can be used amply.

3. The present invention has functions of operating easily, simple structure, assembling easily, and, besides, the manufacturing cost is lowered due to the function of reducing volume of the enclosure.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An improved brake structure of a tape measure, which at least comprises:

an enclosure of said tape measure combined with a turning wheel for wrapping a tape therein, wherein said enclosure mainly comprises an upper housing and a lower housing, a pair of corresponding slide slots being set in said upper housing and said lower housing, a pair of lodging troughs being extended from a position which is at an end portion of said sliding slots and near an outlet of said tape, a pair of position columns being set at a proper position below a lodging slot;

a control part, wherein a push key is set thereon and a pair of slide ways are set at both sides, and a slide piece is extended from a front end portion, a pair of lodging blocks being respectively extended from both sides of said slide piece, an inset hole being set at a front end of said slide piece;

a brake part, wherein a main part is a hollow column to enable to be slipped on and rotate about said position columns of said upper housing and said lower housing, a guide piece and a brake piece being further extended from said main part;

said slide ways of both sides of said control part being combined in said sliding slots of said upper housing and lower housing, said lodging blocks of said slide piece at the front end portion of said control part being lodged at an upper edge of said lodging troughs, said inset hole being used to combining with said guide piece of brake part; when said control part is moved downward, said lodging blocks of the front end being lodged in said lodging trough of said end portion of said sliding slots to position said control part and make said guide piece of said brake part move downward such that said main part of said brake part turns in a certain angle to make said brake piece hold to a surface of said tape to achieve a braking purpose.

2. An improved brake structure of a tape measure as recited in claim 1, wherein said position columns of said upper housing and said lower housing are hollow columns, and have a plurality of internal threats for locking with a screw such that said upper housing and lower housing can be combined steadily and useful space can be utilized amply.

3. An improved brake structure of a tape measure as recited in claim 1, wherein said sliding slots are set at an inner side of one side of said upper housing and lower housing according to an arc curve of said turning wheel and are arc-shaped such that whole volume of said tape measure can be reduced.

* * * * *